(No Model.)

C. F. WALKER.
BICYCLE LAMP ATTACHMENT.

No. 599,409. Patented Feb. 22, 1898.

Witnesses:
Chas. E. Gaylord
Lute J. Peters

Inventor:
C. F. Walker
By L. B. Coupland
Attys.

UNITED STATES PATENT OFFICE.

CHARLES F. WALKER, OF CHICAGO, ILLINOIS.

BICYCLE-LAMP ATTACHMENT.

SPECIFICATION forming part of Letters Patent No. 599,409, dated February 22, 1898.

Application filed March 29, 1897. Serial No. 629,773. (No model.)

*To all whom it may concern:*

Be it known that I, CHARLES F. WALKER, a citizen of the United States, residing at Chicago, in the county of Cook and State of Illinois, have invented certain new and useful Improvements in Bicycle-Lamp Attachments; and I do hereby declare the following to be a full, clear, and exact description of the invention, such as will enable others skilled in the art to which it appertains to make and use the same.

This invention relates to improvements in that class of devices or attachments that are used in connection with bicycles for holding a lamp or lantern on some convenient part of the frame, as will be hereinafter set forth.

Figure 1:
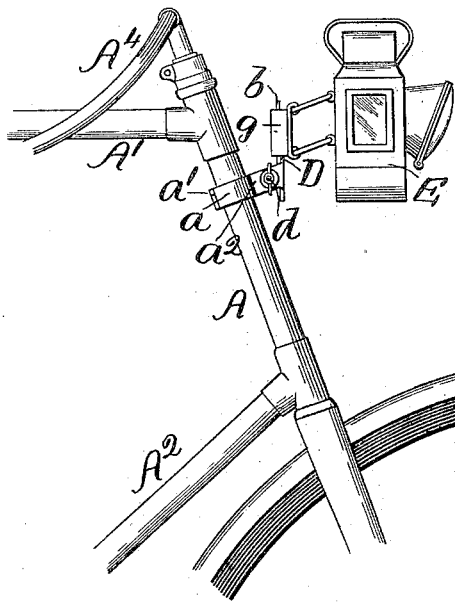
Figure 2:
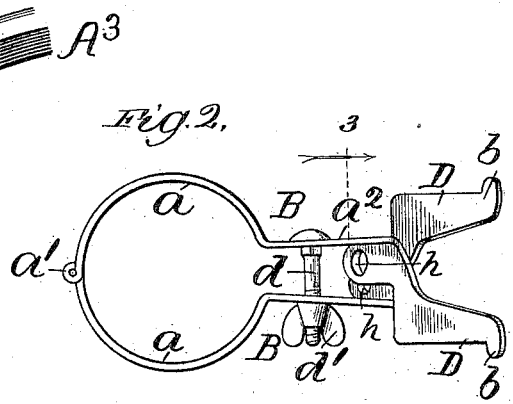
Figure 3:
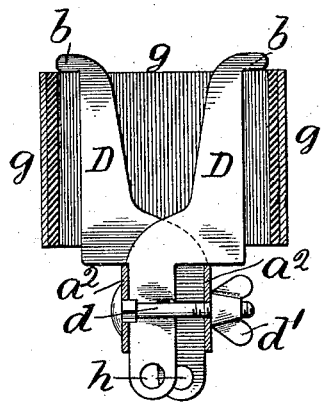

Figure 1 is a broken-away elevation of the front part of the frame and steering-head embodying the improvement; Fig. 2, a plan of the lamp-holding bracket; Fig. 3, a vertical transverse section on line 3, Fig. 2, looking in the direction indicated by the arrow; and Fig. 4, a similar view showing the arms of the bracket in their opposite position.

Figure 4:
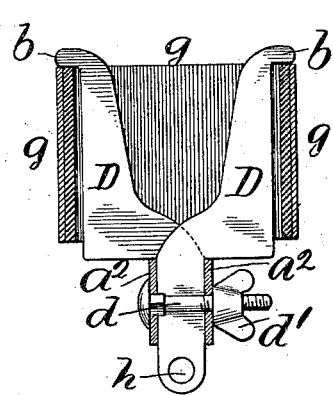

A may represent the front frame-tube; A', the upper main tube; $A^2$, the lower main tube; $A^3$, the steering-wheel, and $A^4$ the handle-bar. The bracket attachment consists of two companion spring members B B, comprising the collar parts $a$ $a$, hinged together on one side, as at $a'$, and open on the opposite side, the horizontally-extended parts $a^2$ $a^2$ and the inclined or vertical arms D D formed integral. These arms overlap and cross each other at the base, and from that upwardly spread apart, as shown, and terminate in the hook ends $b$ $b$. The two bracket members are adjustably held together by a bolt $d$, inserted through the parts $a^2 a^2$. The bolt $d$ has the adjusting thumb-nut $d'$ threaded on one end thereof. The collar part of the bracket is fixed on the frame-tube A, as shown in Fig. 1. By loosening up on the nut $d'$ the parts $a^2$ $a^2$ of the bracket will spread apart and the arms D D draw nearer together, as shown in Figs. 2 and 3. In this position the attaching-sleeve $g$ of the lamp E may be slipped down over the bracket-arms, as shown in Figs. 1 and 3, to support the lamp in its proper position. By tightening up on the nut $d$ the parts $a^2 a^2$ are forced in the direction of each other and the arms D D expanded, the terminal hook ends $b$ $b$ projecting over the top edge of sleeve $g$ at opposite sides, as shown in Fig. 4, and locking the lamp in place against being lifted off and stolen. The holes $h$ in the lower ends of the arms D D provide for the attachment of a padlock, thus affording additional security.

Many lamps are attached to a bicycle in such a manner as to be readily lifted off by a person passing by. This arrangement will make this impossible, as the clamping-bolt would have to be first loosened up before the lamp can be removed.

Having thus described my invention, what I claim as new, and desire to secure by Letters Patent, is—

1. A bicycle-lamp bracket, comprising, in its integral structure, the companion collar parts, having a hinged connection on one side and open on the opposite side, the horizontal parts, projecting from the open side, the inclined or vertical arms, crossing each other and adapted to have a lateral adjustment, and a clamping-bolt, inserted through the horizontal parts, substantially as described.

2. A bicycle-lamp bracket, comprising a collar part, the horizontal parts, extending therefrom, the inclined or vertical arms, crossing each other at the base and terminating at the top in hooked ends, and a clamping-bolt, for adjusting said arms, substantially as described.

3. A bicycle-lamp bracket consisting of companion members, comprising a collar part, the parts extending therefrom, and the inclined arms, crossing each other and perforated in the base for the insertion of a locking device, substantially as described.

In testimony whereof I affix my signature in presence of two witnesses.

CHARLES F. WALKER.

Witnesses:
L. M. FREEMAN,
L. B. COUPLAND.